(12) United States Patent
Olsen et al.

(10) Patent No.: US 6,953,121 B2
(45) Date of Patent: Oct. 11, 2005

(54) VIBRATING SCREEN

(75) Inventors: Lawrence Calvin Olsen, Springfield, OR (US); Benjamin James Boyce, Eugene, OR (US)

(73) Assignee: Johnson Crushers International, Eugene, OR (US)

( * ) Notice: Subject to any disclaimer, the term of this patent is extended or adjusted under 35 U.S.C. 154(b) by 142 days.

(21) Appl. No.: 10/430,098

(22) Filed: May 5, 2003

(65) Prior Publication Data

US 2004/0222135 A1 Nov. 11, 2004

(51) Int. Cl.$^7$ ................................................ B07C 5/01
(52) U.S. Cl. ...................... 209/309; 209/311; 209/405; 209/346
(58) Field of Search .......................... 209/309, 310–358

(56) References Cited

U.S. PATENT DOCUMENTS

| | | | | |
|---|---|---|---|---|
| 4,381,235 A | * | 4/1983 | Mallaghan | ................ 209/400 |
| 5,851,393 A | * | 12/1998 | Carr et al. | ................ 210/489 |

* cited by examiner

*Primary Examiner*—Donald P. Walsh
*Assistant Examiner*—Jonathan R. Miller
(74) *Attorney, Agent, or Firm*—Schwabe Williamson & Wyatt

(57) ABSTRACT

A vibrating screen assembly supported by springs is provided which is used to size separate rock and other material. The present invention includes increasing the natural frequency of the screen assembly by stiffening the individual screen decks of the screen assembly, to enable the screen assembly to operate at higher operating speeds without prematurely failing.

26 Claims, 2 Drawing Sheets

VIBRATING SCREEN

FIELD OF THE INVENTION

This invention relates to a screen assembly for separating rock material, and more particularly to a modified vibrating screen that enhances the screen assemblies' ability to resist cracking of the screen decks and side plates, and prevent overall screen assembly failure and thereby enable increased vibration.

BACKGROUND OF INVENTION

Screen assemblies are used in the aggregate business for separating rock, crushed rock, gravel, sand, and the like (referred herein as material) into various sizes. Screen assemblies typically comprise one or more screen decks containing a perforated screening medium, which acts as a sieve through which the material is separated. A charge of material is deposited on the receiving end of the screen deck of a screen assembly, and as the material is conveyed to the discharge end, smaller material falls through the openings leaving the larger material retained on the screen deck. In a three-deck screen assembly, for example, larger material is retained on the upper screen deck and conveyed off of the screen deck at the upper discharge end, the medium-sized material is retained on the middle screen deck and conveyed off of the screen deck at the middle discharge end, the smaller size material is retained on the lower screen deck and conveyed off of the screen deck at the lower discharge end, and the smallest material is deposited below the lower screen deck.

Screen assemblies generally come in two basic screen deck configurations; inclined and horizontal, both of which use vibratory motion to help pass the material through the screening medium as the material is conveyed across the screen decks. Inclined screen assemblies have one or more screen decks with an elevated receiving end. The movement of material across the screen deck is provided by gravity in combination with the assistance of a vibrating mechanism. Horizontal screen assemblies convey material across the deck by virtue of the vibration of the screen assembly being angularly directed from the receiving end to the discharge end and by mounting the screen assembly on springs.

The screen deck generally consists of a rigid frame upon which a screening medium is laid or supported. The screening medium contains a plurality of openings of a predetermined size. Examples of screening medium include woven wire cloth, perforated plate and urethane plates with presized holes. When multiple screen decks are used, they are held together by large side plates, thereby making a screen assembly or a basket. To withstand the wear and tear of material separation process, screen assemblies are constructed out of heavy-duty steel, resulting in the screen assemblies weighing several tons.

It has been found that in certain screening applications, the screen assemblies have been prematurely failing when run at higher operating speeds, such as those desired when separating finer materials or in wet screening applications. In particular, the bracing of the screen decks, as well as the side plates and connections prematurely crack, leading to failure of the screen assemblies. These failures have occurred even where the screen assembly has substantial useful life remaining.

There is a need for an improved screen assembly design that will prevent screen assembly failure, e.g. cracking of the screen decks, side plates and the like, especially where the charge loads are greater thus resulting in a greater overall operating weight, or when a higher operating speed is required for effective separation.

SUMMARY OF INVENTION

An embodiment of the present invention is derived from an investigation into what causes the failure of the screen assemblies when they are operated at higher operating speeds or where the loads being processed are heavier. It was determined that the failures were occurring when the screen assembly operated in or close to the natural frequency range of the screen assemblies. This resulted in severe torsion effects, which caused cracking and premature failure of the screen assemblies.

To prevent cracking at higher operating speeds, it was determined that the natural frequency of the screen assembly needed to be raised. One way to accomplish raising the natural frequency, it was found, was to make the screen assemblies more rigid. To increase rigidity, however, generally requires the addition of weight, which, it has been found, has the effect of lowering the natural frequency of the screen assembly. The lower natural frequency amplifies the failure problem because the operating range must then be lower, which reduces the screen assemblies effectiveness in certain applications. One embodiment of the present invention solves the problem of premature failing at higher operating speeds by adding a third cross brace in the middle of each screen deck, in addition to cross braces on each end of each screen deck. This has been found to provide an increase in the natural frequency, as the additional weight of the cross braces is more than off set by the increased stiffness. Raising the overall natural frequency of the screen assembly in this manner allows the screen assemblies to run at higher operating speeds without premature failure.

DESCRIPTION

Figure 1:
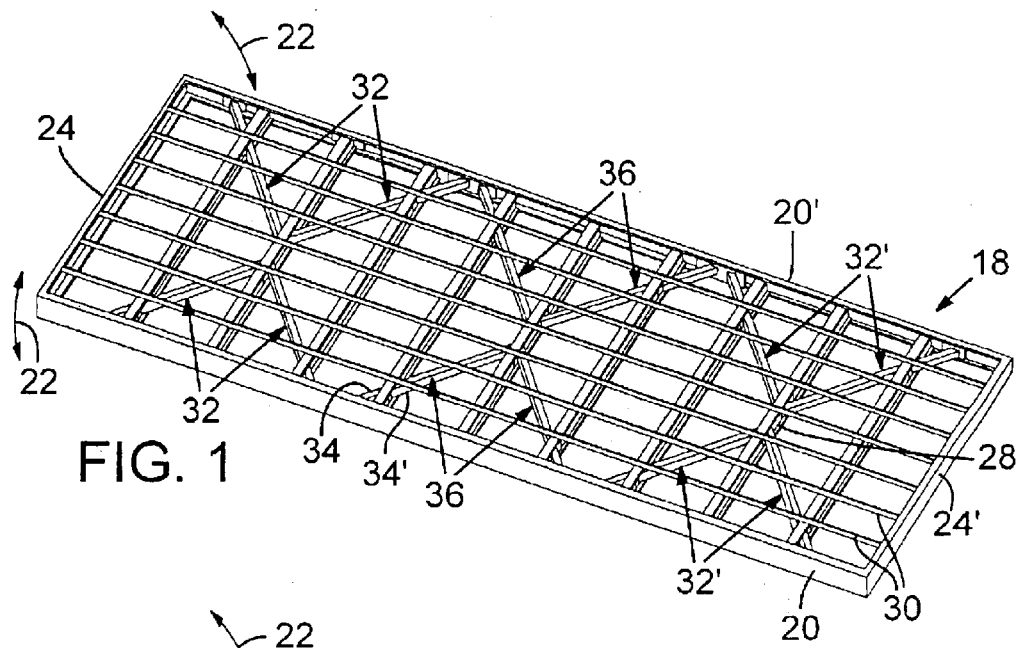
FIG. 1 is an isometric view of a single screen deck in accordance with an embodiment of the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Natural frequency is the frequency at which an object naturally wants to oscillate. Virtually all objects have a natural frequency, screen decks and screen assemblies being no exception. The natural frequency of an object depends on a number of factors, including but not limited to the object weight, material, stiffness, object dimensions, and the like. No one factor is dispositive. When an object vibrates at or near its natural frequency, the object is most susceptible to failure. In vibratory screening applications, it has been found that operating at or near the natural frequency is a disadvantage, as the rate of oscillation to the point of achieving at or near natural frequency will cause the bracing and component interconnections to fail. It therefore becomes necessary to operate the screen assembly at a frequency below its natural frequency and this frequency may be less than what is desirable for optimal screening action.

As previously discussed, vibrating screen assemblies sort material through a combination of vibratory action and a size selected screening medium that allows material to either pass through the medium or across the top of the screen deck. It has been found that two factors, weight and stiffness through design, tend to have a dramatic effect on the natural frequency of the screen assembly. In particular, increasing the overall weight, whether it be through design changes or processing certain materials, reduces the natural frequency of the screen assemblies. Contrarily, designing the screen assembly to be more rigid increases the natural frequency of the screen assembly. Thus weight and rigidity are typically directly related (increasing rigidity increases weight), but weight and rigidity have inverse impacts on the natural frequency.

A variety of situations can impact the weight/stiffness to natural frequency ratio. For example, using wire cloth as a screening material reduces the overall weight of the screen assembly and increases rigidity. Thus, the overall natural frequency increases, which in turn allows for the screen assembly to be operated at a higher rpm without over stressing the screen assembly or its component parts. Wire cloth, however, does not adequately resist wear caused by more abrasive materials. Urethane screening material is considerably more resistant to wear than wire cloth. But, urethane is generally heavier than wire cloth and does not add to the rigidity of the screen deck and screen assembly. This combination results in the natural frequency being lower due to the increased weight and decreased rigidity. The screen assembly must then operate at a lower operating speed to avoid operating at the natural frequency of the screen assembly.

FIG. 1 is an isometric view of an embodiment of a single screen deck 18 in accordance with the present invention, where the weight to rigidity ratio has been improved over that of the prior art designs, such that the natural frequency is higher. The screen deck is made of opposable side members 20 and 20' and opposable end members 24 and 24'. Side members 20 and 20' are connected to end members 24 and 24' to form a frame of a desired shape. In the illustrated embodiment, the frame is rectangular in shape, but it can be appreciated by one skilled in the art that the shape can be varied depending on screening requirements. Multiple cross members 28 extend between the opposable side members 20 and 20'. It has been found that crowned fabricated I-beams provide increased stiffness properties at a lower overall weight, however, any other beams could be used depending on whether more or less rigidity is required. Multiple stringers 30 extend between the end members 24 and 24', and are generally perpendicular to the cross members 28. It is preferred that the stringers 30 be positioned such that they ride on top of or above the cross members 28 at their intersection, which results in a better support structure for the screening material that will be disposed on the screen deck 18 (not shown).

The cross members 28 and stringers 30 can be made of a variety of different materials and be of many shapes. However, since weight is an important factor affecting the natural frequency of the screen deck 18, it is important to select a size and shape that minimizes weight and maximizes stiffness. In the illustrated embodiment, the cross members 28 are I-beams and the stringers are flat bar, and both are made out of steel.

To increase stiffness, and resist torsional forces, shown by torsion arrows 22, three cross braces are disposed within the frame of screen deck 18, cross braces 32 and 32' being located at each end of the screen deck 18, and one cross brace 36 positioned in the middle of the screen deck 18. Prior screen decks have been known to have cross braces at each end of the screen deck but heretofore it was not considered beneficial and thus undesirable to provide cross bracing at the center of the deck. The inventors hereof decided to challenge this conventional wisdom and determined that the additional center bracing was indeed beneficial. The increased rigidity benefit of the additional cross brace 36, it has been found, far outweighs the adverse impact of the additional weight, and results in a significant net natural frequency increase. For example, a typical screen deck with two cross braces 32 and 32' and having a weight of approximately 2800 pounds, has a natural frequency of approximately 334 cycles per minute. By adding center cross braces 36 to this same screen deck 18, the weight increased to approximately 3292 pounds, but the added stiffness resulted in a natural frequency increase to 459 cycles per minute, more than a 15% increase.

In the illustrated embodiment, shown in FIG. 1, the cross braces are made up of diagonally disposed segments 34 and 34', with the first segment 34 diagonally extending between the side members 20 and 20' and a cross member 28. A second segment 34' extends diagonally between two cross members 28. This segmented cross bracing generally forms an X shape and renders the screen deck itself stiffer and more resistant to torsion. In the illustrated embodiment, segments 34 and 34' have plates on each end adapted to connect to either the side walls 20 and 20' or the cross members 28. Segments 34 and 34 prime can be secured to side members 20 and 20' or cross members 28 in a variety of ways, including, but not limited to bolting, welding and the like.

Figure 2:
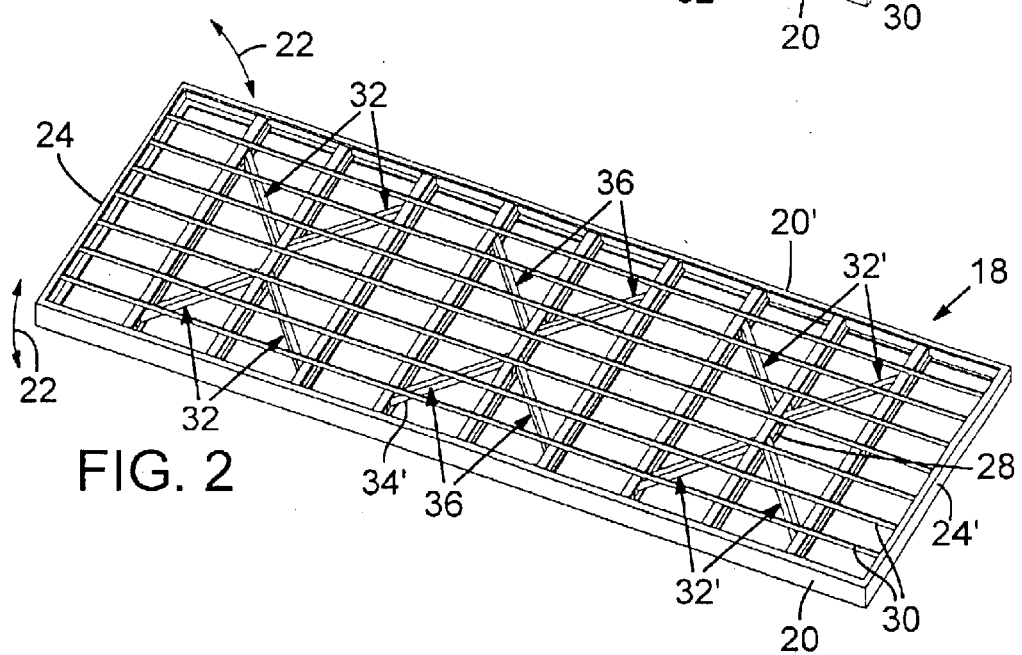
FIG. 2 is similar to FIG. 1 but illustrating a second embodiment.

FIG. 2 is an isometric view of another embodiment of a screen deck in accordance with the present invention. The screen deck is made of opposable side members 20 and 20' and opposable end members 24 and 24'. Side members 20 and 20' are connected to end members 24 and 24' to form a frame of a desired shape. Multiple cross members 28 extend between the opposable side members 20 and 20'. Multiple stringers 30 extend between the end members 24 and 24', and are generally perpendicular to the cross members 28. To increase stiffness, and resist torsional forces, shown by torsion arrows 22, three cross braces are disposed within the frame of screen deck 18, cross braces 32 and 32' being located at each end of the screen deck 18, and one cross brace 36 positioned in the middle of the screen deck 18. Cross braces 32 and 36 are made up of diagonally disposed segments 34' that extend between the cross members 28. This segmented cross bracing generally forms an X shape and renders the screen deck itself stiffer and more resistant to torsion.

Figure 3:
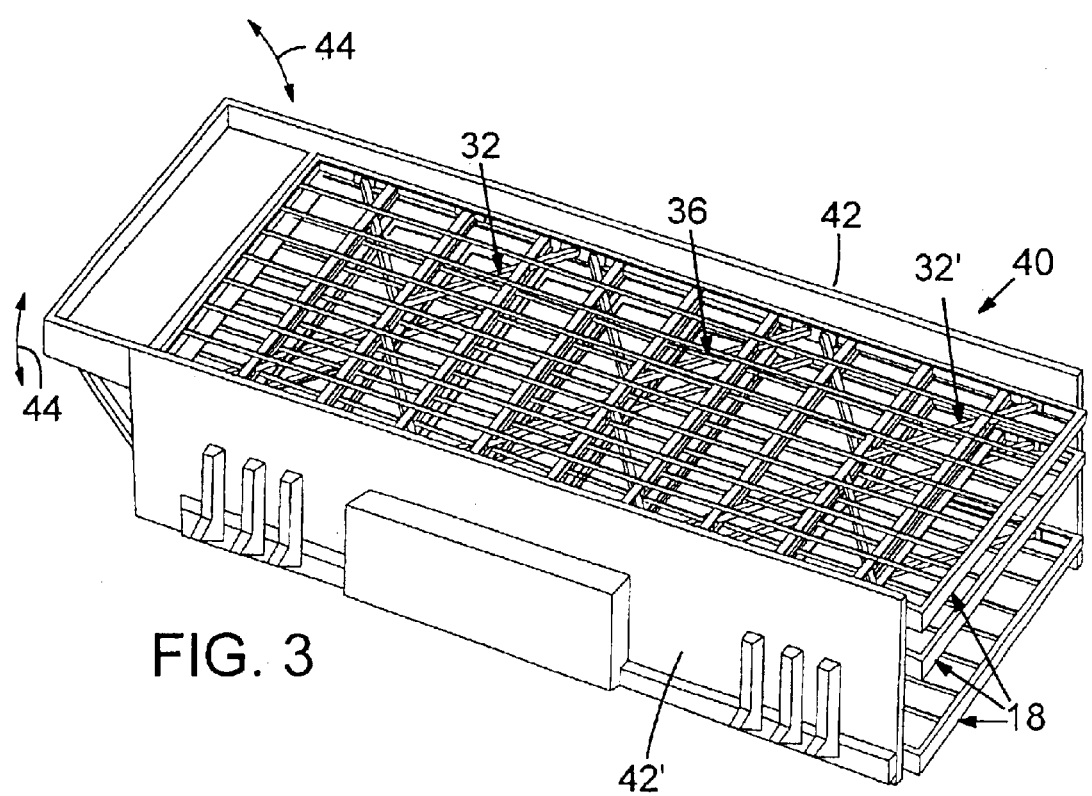
FIG. 3 is an isometric view of a screen assembly comprised of multiple screen decks as illustrated in FIG. 1.

FIG. 3 is an isometric view of a screen assembly 40 in accordance with the present invention. As illustrated, three screen decks 18 are generally horizontally disposed between two side plates 42 and arranged in a vertical relationship to each other. It can be appreciated by one skilled in the art that fewer or more screen decks can be used depending on the material size sorting that needs to be done. Because of the multiple screen decks 18, side plates 42, and additional components adapted to enable operation of the screen assembly, a significant weight increase is encountered.

Typically, the side plates 42 and the additional operating components do not increase stiffness, but only add weight, which results in a lower overall natural frequency. It is therefore an overall goal to increase the stiffness of the screen assembly in such a way that it counteracts the added weight to keep natural frequency higher. It have been found that stiffening the individual screen decks 18 by including center cross braces 36, in accordance with the present invention, achieves this goal and results in a higher natural frequency for the screen assembly than a screen assembly having screen decks with no center cross braces 36. This increase of stiffness resists the torsional movement indicated by torsion lines 44. For example, a screen assembly comprising three screen decks without center cross braces 36 resulted in an overall natural frequency of approximately 1080 cycles per minute. Whereas a similar sized screen assembly 40 with three screen decks 18 having center cross braces 36 resulted in an overall natural frequency of 1220 cycles per minute, which is over a 12% increase over the prior art designs.

In concluding that the center pair of cross bracing resulted in the optimal weight versus stiffness ratio and resulted in overall higher natural frequency of a screen assembly, a number of other techniques were explored. One such technique included adding torsion tubes between the side plates in an attempt to resist the torsion of the screen assembly as its operating speeds approached the natural frequency. Also, a variety of different screen deck designs were considered where the cross bracing configurations, cross members and stringers were varied. Adding the third pair of cross braces 36 to the middle of the screen deck 18 was found to be optimal, in that it resulted in the highest natural frequency, given the added weight.

Again, this increase in the natural frequency is advantageous because it allows the screen assembly to operate at higher speeds without overstressing the component parts. Operators no longer need to sacrifice efficiency by keeping the operating speed lower than optimal simply to prevent the screen assembly from prematurely failing. The increased natural frequency also facilitates using urethane screen material and can operate at higher operating speeds.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A vibrating screen assembly comprising:
   opposable side walls;
   at least one screen deck rigidly disposed within the opposable side walls, the screen deck adapted for size sorting material, the screen deck further comprising
   opposable end members;
   opposable side members, the end members and the side members being arranged to form a frame;
   a plurality of cross members extending between the side members;
   a plurality of stringers extending between the end members; and
   at least three cross braces disposed within the frame, wherein each cross brace generally forms a X-shape and spans a majority of the distance between the opposable side members.

2. The vibrating screen assembly of claim 1, wherein one cross brace is positioned in the center portion of the screen deck between the opposable end members.

3. The vibrating screen assembly of claim 1, wherein the at least three cross braces are diagonally disposed between the side members.

4. The vibrating screen assembly of claim 1, wherein the cross braces are comprised of multiple segments, each segment having a first end and a second end and each cross brace having a vertical cross-sectional dimension and a horizontal cross-sectional dimension.

5. The multiple segments of claim 4, wherein the first end of at least one segment is adapted to interconnect with a side member and the second end is adapted to interconnect with a cross member, and wherein the first end of at least one segment is adapted to interconnect with a cross member and the second end is adapted to interconnect to a different cross member.

6. The multiple segments of claim 4, wherein the vertical cross-sectional dimension is greater than the horizontal cross-sectional dimension.

7. The vibrating screen assembly of claim 1, wherein the cross members are crowned fabricated I-beams.

8. The vibrating screen assembly of claim 1, wherein the stringers are positioned on top of the cross members.

9. A screen deck for size sorting material comprising:
   opposable end members;
   opposable side members, the end members and the side members being arranged to form a frame;
   a plurality of cross members extending between the side members;
   a plurality of stringers extending between the end members;
   at least three cross braces disposed within the frame, wherein each cross brace generally forms an X-shape and spans a majority of the distance between the opposable side members; and
   a screening material secured to one side of the screen deck adapted to sort material by size.

10. The screen deck of claim 9, wherein one cross brace is positioned in the center portion of the screen deck between the opposable end members.

11. The vibrating screen assembly of claim 9, wherein the at least three cross braces are diagonally disposed between the side members.

12. The screen deck of claim 9, wherein the cross braces are comprised of multiple segments, each segment having a first end and a second end and each cross brace having a vertical cross-sectional dimension and a horizontal cross sectional dimension.

13. The multiple segments of claim 12, wherein the first end of at least one segment is adapted to interconnect with a side member and the second end is adapted to interconnect with a cross member, and wherein the first end of at least one segment is adapted to interconnect with a cross member and the second end is adapted to interconnect to a different cross member.

14. The multiple segments of claim 12, wherein the vertical cross-sectional dimension is greater than the horizontal cross-sectional dimension.

15. The vibrating screen assembly of claim 9, wherein the cross members are crowned fabricated I-beams.

16. The vibrating screen assembly of claim 9, wherein the stringers are positioned on top of the cross members.

17. A vibrating screen assembly comprising:
opposable side walls;
at least one screen deck rigidly disposed within the opposable side walls, the screen deck adapted for size sorting material, the screen deck further comprising
opposable end members;
opposable side members, the end members and the side members being arranged to form a frame;
a plurality of cross members extending between the side members;
a plurality of stringers extending between the end members; and
at least three cross braces extending between two or more cross members, wherein each cross brace generally forms an X-shape and spans a majority of the distance between the opposable side members.

18. The vibrating screen assembly of claim 17, wherein one cross brace is positioned in the center portion of the screen deck between the opposable end members.

19. The vibrating screen assembly of claim 17, wherein the cross braces are comprised of multiple segments, each segment having a first end and a second end and each having a vertical cross-sectional dimension and a horizontal cross-sectional dimension.

20. The multiple segments of claim 19, wherein the first end of the multiple segments is adapted to interconnect with a cross member and the second end is adapted to interconnect to a different cross member.

21. A screen deck for size sorting material comprising:
opposable end members;
opposable side members, the end members and the side members being arranged to form a frame;
a plurality of cross members extending between the side members;
a plurality of stringers extending between the end members; and
at least three cross braces extending between the one or more cross members, wherein each cross brace generally forms an X-shape and spans a majority of the distance between the opposable side members; and
a screening material secured to one side of the screen deck adapted to sort material by size.

22. The vibrating screen assembly of claim 21, wherein one of cross braces is positioned in the center portion of the screen deck between the opposable end members.

23. The vibrating screen assembly of claim 21, wherein the cross braces are comprised of multiple segments, each segment having a first end and a second end and each having a vertical cross-sectional dimension and a horizontal cross-sectional dimension.

24. The multiple segments of claim 23, wherein the first end of the multiple segments is adapted to interconnect with a cross member and the second end is adapted to interconnect to a different cross member.

25. A vibrating screen assembly comprising:
opposable side walls;
at least one screen deck rigidly disposed within the opposable side walls, the screen deck adapted for size sorting material, the screen deck further comprising
opposable end members;
opposable side members, the end members and the side members being arranged to form a frame;
a plurality of cross members extending between the side members, wherein the plurality of cross members are crowned fabricated I-beams;
a plurality of stringers extending between the end members; and
at least three cross braces diagonally disposed within the frame.

26. A screen deck for size sorting material comprising:
opposable end members;
opposable side members, the end members and the side members being arranged to form a frame;
a plurality of cross members extending between the side members, wherein the cross members are crowned fabricated I-beams;
a plurality of stringers extending between the end members;
at least three cross braces diagonally disposed within the frame; and
a screening material secured to one side of the screen deck adapted to sort material by size.

* * * * *